United States Patent [19]

Osborne et al.

[11] Patent Number: 4,485,307

[45] Date of Patent: Nov. 27, 1984

[54] MEDICAL GAMMA RAY IMAGING

[75] Inventors: Louis S. Osborne, Lexington; Richard C. Lanza, Brookline, both of Mass.

[73] Assignee: Massachusetts Institute of Technology, Cambridge, Mass.

[21] Appl. No.: 343,077

[22] Filed: Jan. 27, 1982

[51] Int. Cl.³ .............................................. G01T 1/18
[52] U.S. Cl. .................................................. 250/385
[58] Field of Search ...................... 250/374, 375, 385; 313/93

[56] References Cited

U.S. PATENT DOCUMENTS 3,262,002  7/1966  Kreplin ................................. 313/93
3,359,421  12/1967  Perez-Mendez et al. .
3,603,831  9/1971  Kimmel ................................. 313/93
3,703,638  11/1972  Allemand et al. .
3,772,521  11/1973  Perez-Mendez ...................... 250/385
3,786,270  1/1974  Borkowski et al. .................. 250/385
4,320,299  3/1982  Bateman et al. ..................... 250/385

Primary Examiner—Janice A. Howell
Attorney, Agent, or Firm—Arthur A. Smith, Jr.; Thomas J. Engellenner

[57] ABSTRACT

A method and apparatus for determining the distribution of a position-emitting radioisotope into an object, the apparatus consisting of a wire mesh radiation converter, an ionizable gas for propagating ionization events caused by electrodes released by the converter, a drift field, a spatial position detector and signal processing circuitry for correlating near-simultaneous ionization events and determining their time differences, whereby the position sources of back-to-back collinear radiation can be located and a distribution image constructed.

15 Claims, 4 Drawing Figures

MEDICAL GAMMA RAY IMAGING

The government has right in this invention pursuant to Contract No. ET-78-S-02-4969.

TECHNICAL FIELD

This invention relates to gamma ray imaging devices and, particularly, to medical diagnostic devices for obtaining first-order focused images of internal organs using short-lifed, positron-emitting, radioisotopes.

BACKGROUND OF THE INVENTION

Attention is directed to our co-pending patent application, filed herewith, entitled "Wire-Laying Machine for Medical Imaging Devices", hereby incorporated by references.

The development of surgical and medical treatments for internal disorders, such as heart disease, has dramatized the need for non-invasive methods of diagnosing such conditions. For example, up until recently ischemic heart disease, a common adult cardiac problem caused by inadequate blood flow to regions of the heart, could only be diagnosed by a coronary arteriogram. Since the arteriogram involved an injection directly into the heart chamber via a catheter, this risky procedure was only warranted when the heart condition became severe (i.e. chronic chest pain—angina pectoris, circulatory failure—congestive failure or infarction—heart attack). Aside from the fact that catheterization was unacceptable as a screening technique, it was also not possible to make comparitive measurements of resting and stressed conditions.

Recently, radionuclides have been developed that permit heart imaging without catheterization, and which also permit measurement directly after exercise. Radioactive potassium-43 and potassium-analogues, such as rubidium-81, cesium-129 and thallium-201, have been proposed for intra-venous injection and measurement. Once injected into a vein these compounds travel to the heart and reach a maximum distribution (heart-to-blood) within a few minutes. At present, thallium-201, an isotope with a three-day half-life, is in use as a radiotracer because its decay products may be imaged with conventional scintillation cameras. However, its relatively long half-live and high patient dose often preclude serial examinations. In heart diagnostic use a scintillation camera image is compared to a normal or expected radioisotope distribution; areas of low radioisotope perfusion suggest dead myocardial cells due to an infarction or other blood flow restrictions.

Prior art scintillation cameras operate on the principle that a high energy photon (gamma ray) emitted from a radioisotope will produce a flash of light in a phosphorescent crystal, such as sodium iodide. Typically, a camera will employ a large, thin scintillation crystal, an array of photomultiplier tubes, a multichannel collimator, so that only the radioactivity directly in front of the sensitive surface can register, and circuitry to analyze the pulses produced by the photomultipliers to create a distribution image of the radiotracer in the patient.

The scintillation camera suffers from a number of limitations on its ability to accurately assess disorders in myocardial perfusion. Firstly, the resolution of a scintillation camera varies with depth. Secondly, the gamma radiation is attenuated in tissues between the region of interest and the detector. Thirdly, when a scintillation camera is used with very short half-life, higher activity radiotracers, such as rubidium 82 (a positron emitter with a 75 second half-life), the scintillation camera saturates below the activity levels necessary for adequate statistics, and, fourthly, the sensitivity of the camera is limited by the "solid angle" subtended by a collimator hole.

Moreover, conventional scintillation cameras fail to make use of the unique characteristics of positron-emitting isotopes. When a position is emitted during radioisotope decay, the positron is quickly annihilated by collision with an electron; the annihilation generates two collinear (back-to-back) 511 keV gamma rays. Thus, two detectors with sufficiently large surface areas positioned on opposite sides of the patient can detect the time coincident gamma rays and thereby determine their flight path. When sufficiently large statistics are available a lateral tomograph of the organ of interest can be obtained and the sensitivity is now determined by the solid angle subtended by the whole camera as opposed to a collimator hole.

Various attempts have been made to develop an apparatus to detect the collinear gama rays generated by positron annihilation. Scintillation techniques have been less than successful because of the limitations on spatial resolution inherent in the crystals. Attention is directed to an article by J.E. Bateman et al entitled "The Development of the Rutherford Laboratory MWPC Positron Camera" in 176 *Nuclear Instruments and Methods*, 83–88 (1980); an article by A. Jeavons and K. Kull entitled "A Proportional Chamber Positron Camera for Medical Imaging" in 176 *Nuclear Instruments and Methods*, 89–97 (1980); an article by A. Jeavon and G. Charpak entitled "The High Density Multiwire Drift Chamber" in 124 *Nuclear Instruments and Methods*, 491–503 (1975); and an article by A. Jeavon and C. Cate entitled "The Proportional Chamber Gamma Camera" published in the *Proceedings of the IEEE Nuclear Science Symposium*, 19–21 (1975).

Other examples of radiation imaging systems, in general, may also be found in the following: U.S. Pat. No. 3,359,421, issued to V. Perez-Mendez et al on Dec. 19, 1967, entitled "Magnetostrictive Readout For Wire Spark Chambers"; U.S. Pat. No. 3,703,638, issued to R. Allemand et al on Nov. 21, 1972, entitled "Ionization Radiation Detector System For Determining Position Of The Radiation"; U.S. Pat. No. 3,772,521, issued to V. Perez-Mendez on Nov. 13, 1973, entitled "Radiation Camera And Delay Line Readout"; U.S. Pat. No. 3,786,270, issued to C. Borkowski et al on Jan. 15, 1974, entitled "Proportional Counter Radiation Camera".

Typically, non-scintillating, radiation imaging cameras employ a conversion medium (wherein the high energy gamma ray is absorbed, displacing an electron), an electron amplifier, a spatial detection chamber (to determine the position of the amplified electrons), and circuitry to analyze the electrons detected by the proportional chamber and produce an image.

Essentially, a spatial detection chamber permits accurate location of a ion or electron by detecting the electric field disturbances it causes in a charged cartesian coordinate grid. Typically, a series of parallel anode wires are overlaid perpendicular to a series of parallel cathode wires. A charged particle entering the system is drawn to the nearest oppositely charged wire, causing a field disturbance (avalanche) and, consequently, an electrode pulse on the nearest anode and cathode wires which can be detected with appropriate circuitry to define the impact point in the X-Y coordinate plane of the chamber. See B. Rossi and H. Staub, *Ionization Chambers and Counters* (McGraw Hill Publishing Co. 1969) for further details on proportional counters.

Various problems have been encountered by researchers attempting to develop a practical positron imaging camera. Selection of a conversion medium is crucial. The medium must stop a high percentage of gamma rays and convert them into Compton electrons or photoelectrons yet the material must be porous so that the freed electrons leave the solid and enter the gas. Additionally, since the detector circuitry (i.e. the proportional chamber) must be separate from the conversion medium, a means is needed for transferring and amplifying the conversion events so they may be read by the proportional chamber. Moreover, the circuitry from the chamber must be able to handle high data rates on the order of 100,000 counts per second and obtain good resolution ($\sim$ 2 mm). In sum, there exists a need for an inexpensive, efficient radiation imaging camera, robust enough for use in a hospital setting and accurate enough to permit computer-generated tomographs of internal organs using positron-emitting radioisotopes.

In connection with the need for tomographic projections, it should be noted that even when two cameras are used to detect collinear gamma rays from a single annihilation, and both photons are detected, one only knows that the source must lie on a line formed by the two conversion points. To produce a tomograph it is necessary to determine where the source lies along the line. This requires that a positron camera accept events with photon trajectories over a spread in angles to obtain a stereoscopic view of the organ. Therefore, there also exists a need for a first-order focusing mechanism which can be incorporated into the electronics of the gamma ray imaging camera.

SUMMARY OF THE INVENTION

We have discovered that a highly efficient gamma ray imaging system can be constructed using wire formed of a high atomic number and high density metal, such as tungsten, in a crossed mesh pattern as the conversion medium. The cylindrical nature of the wires optimizes the escape probability for the photo-electron into the gas between wires. Moreover, the wire diameter may be chosen to optimize the balance between increased wire material and electron escape probability. The separation between wires is chosen separately. Moreover, the wire meshes may be stacked on top of each other to further improve conversion efficiency.

In another aspect of our invention amplification of the Compton electrons is achieved in the spaces between the mesh wires using an ionizable gas and applying a electric field gradient so that the ionization events can pass in a linear manner through the conversion medium and their positions recorded by conventional spatial position detection chamber techniques. Moreover, we have found that high efficiencies can be achieved with non-flammable gases as the ionizing agent, thus, permitting the use of our system in hospital settings. For example, P-10 gas, a commercially available mixture containing 10% methane and 90% argon, may be used. Other gases, selected for higher drift velocities may also be used. We have also found that only one spatial position detector is needed for each converter even when many stacks of conversion media are employed.

Additionally, we have discovered a simple and effective method of achieving first-order focussed images by analyzing the data from the spatial position chamber when two such chambers are used in tandem on opposite sides of the patient. Essentially, by measuring the difference in time between the arrival of the ionization events (i.e. drifted electrons) at the position detector chambers of each camera, first-order focussing of the radiation source may be obtained.

The invention will be described further in connection with the following illustrations. However, it should be noted that various charges and modifications can be made by those skilled in the art without departing from the spirit and scope of the invention. For example, our preferred embodiment employs multiple stacks of tungsten wire mesh but metals, such as platinum, gold and generally metals having an atomic number of 50 or more, may be used as absorption/conversion media and the metal wire mesh can be fabricated, as a single stack. Various techniques can be used to apply a graded voltage across the conversion media to create an electrostatic drift field, While we prefer a non-inflammable ionization gas for hospital-based imaging devices, other means can be used for transmit ionization events depending on the setting. Moreover, various types of chambers and counters can be used as ionization detectors to determine the spatial position of the ionization events caused by the incident gamma rays. Likewise, the signal processing system can take a variety of forms. For example, delays lines, resistive lines or coded amplifier systems can be employed to poll the wires of the ionization detectors and thereby locate the event unambiguously in space with a minimum number of amplifiers.

Additionally, it should be noted that, while in our described embodiment gamma rays enter at the top of the wire mesh stacks and are converted as the radiation attempts to traverse the stack end-to-end, other arrangements of the stacks vis-a-vis the radiation source may also be employed. For example, the stacks may be arranged so that radiation enters at the side of the stack and attempts to traverse the stack laterally. Moreover, our devices can be employed in a scanning mode to take slice images for cumulative data or may be employed in groups of more than two detectors for cumulative data collection.

DESCRIPTION OF THE PREFERRED EMBODIMENT

Figure 1:
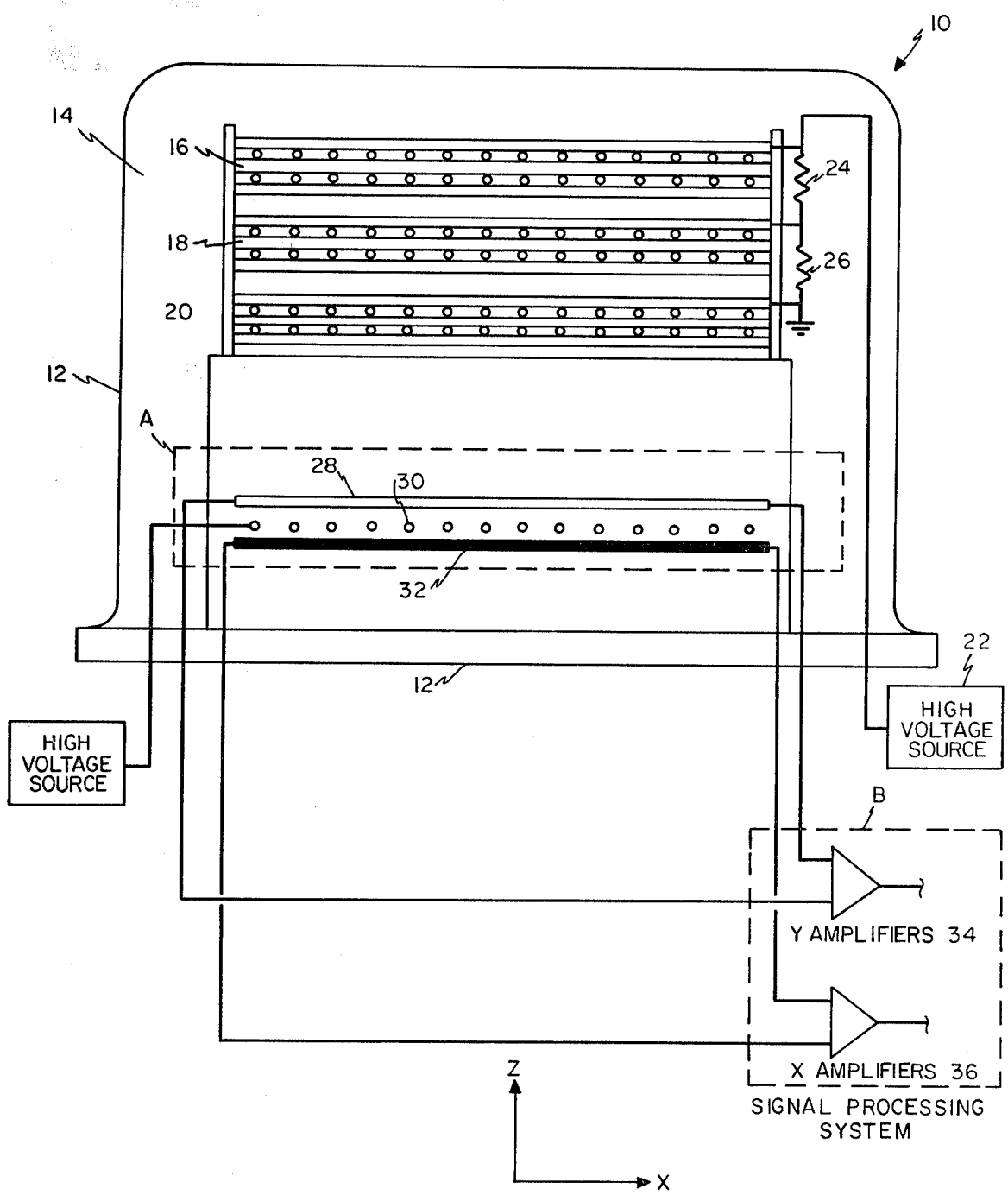
FIG. 1 is a schematic view of our gamma-ray imaging device.

In FIG. 1, the gamma ray imaging device of our invention 10 is shown, having a gas-tight housing 12 and containing an ionizable gas 14. A plurality of wire mesh stacks 16, 18 and 20 are disposed within the housing 12. A graded potential is formed between the stacks 16, 18, 20 and ground by a high voltage source 22 and resistors 24 and 26. Alternate layers of wires are in registry so that the stacks 16, 18, 20 as a whole act as a solid metal member penetrated by holes perpendicular to wire layers, such holes or voids providing the route for electron migration.

Figure 2:
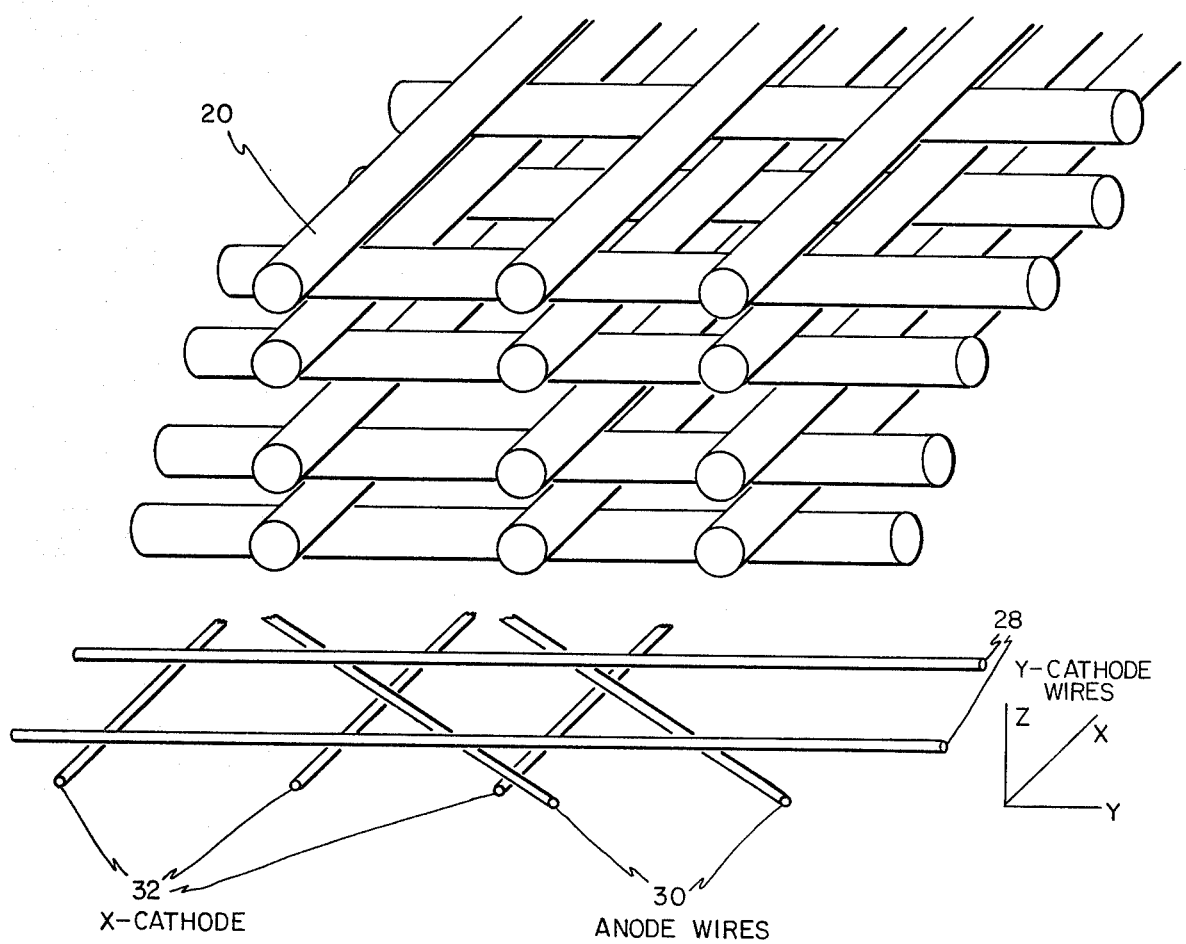
FIG. 2 is a partial schematic view of the conversion stacks and spatial position detector shown in FIG. 1.

The dotted box labelled "A" show a spatial position detecting system. In this embodiment, shown in more detail in FIG. 2, the detector comprises two series of parallel cathode wires 28, 32 sandwiching a series of parallel anode wires 30. The signals transmitted from the detector grid are processed by a signal processing system, labelled "B" in FIG. 1. The system may take the form of individual amplifiers 34, 36 for each cathodic and anodic wire, as shown in FIG. 1, or may be restrictive string or delay line signal processing means or several wires may be interconnected to form a coded read-out.

In operation, the stack of high atomic weight meshes 16, 18 and 20, etc., is placed at a graded voltage, thereby creating an electric field through the holes of the stack. The ionization is drifted through the holes to the proportional wire detector "A".

Figure 3:
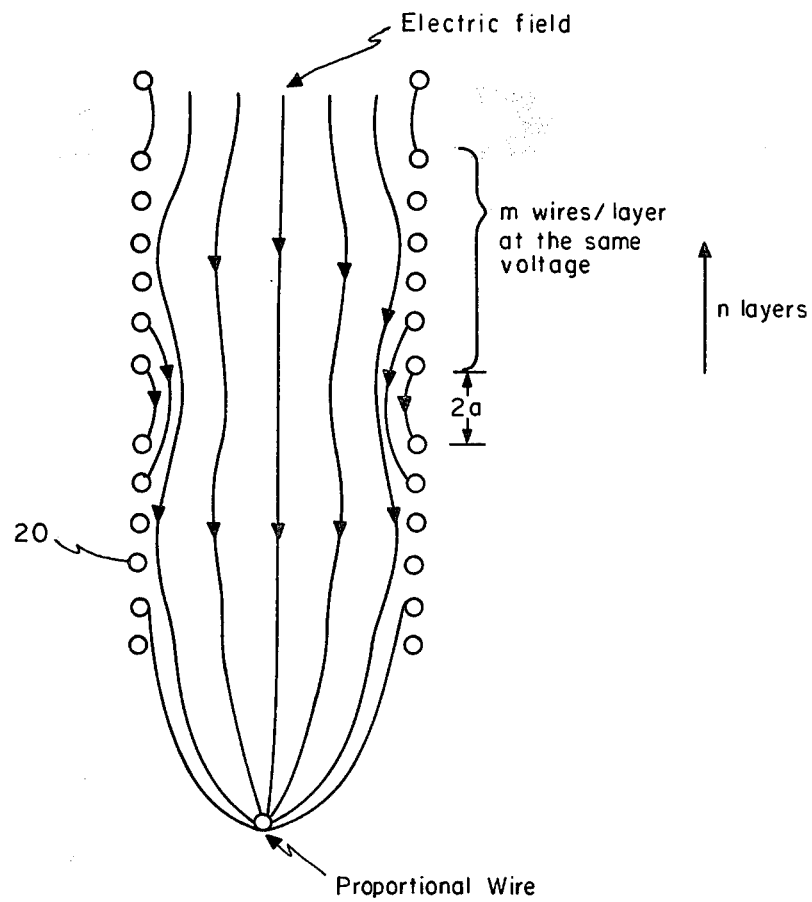
FIG. 3 is a sectional view through the mesh stack, schematically portraying an electron drift field.

FIG. 3 shows the electrostatic drift field about the converting wires 20. Unless the electrons thrown out by the converting wires 20 are collected quickly, diffusion of the electrons will reduce resolution. The creation of an electrostatic field within housing 12, with field force lines perpendicular to the spatial position sensing wires 28 will cause the free electrons to drift quickly towards wires 28 thus following the radiation trajectory path and, thereby, improving image resolution.

Figure 4:
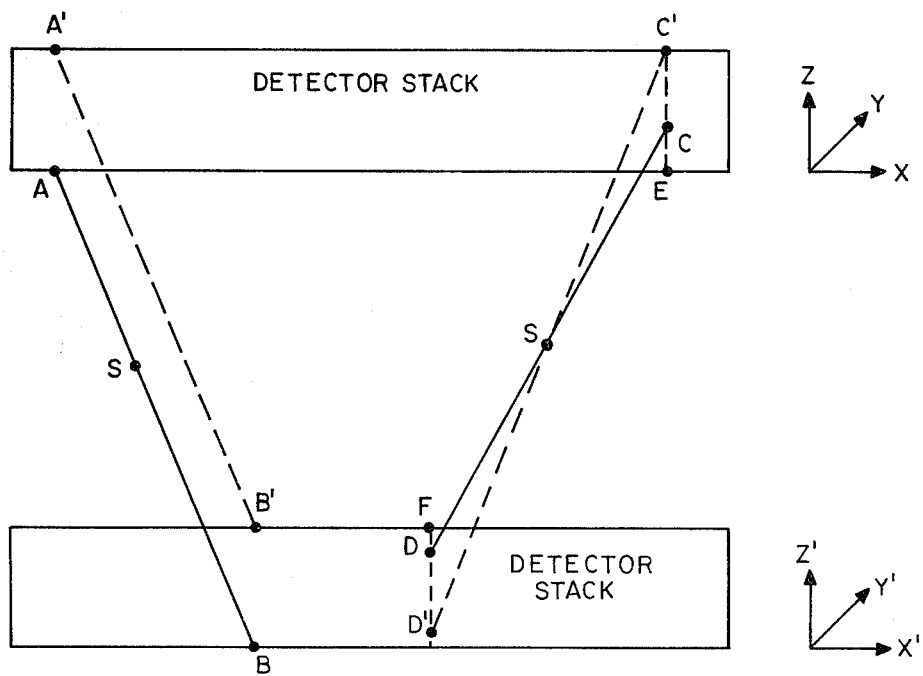
FIG. 4 is a diagrammatic view illustrating first order focusing on a source of back-to-back gamma rays.

In FIG. 4, the first-order focusing mechanism of our invention is shown, comprising two detectors located on opposite sides of the source. To maximize efficiencies, the detectors will subtend a large angle from the source. We will find that a detector of high efficiency will be relatively thick (~10 cm.). If we recorded only x and y information from each detector, the uncertainty in the z positions of the conversion points could lead to an error in the source position. This is illustrated on the left hand side of FIG. 4. The two lines AB and A'B' are compatible with a given xy and x'y' measurement. In our case, measuring the relative drift time of the coincidence event, we measure z+z'. We are using identical detectors; if the drift in the top chamber is toward −z, the drift in the bottom one is toward +z. Two lines compatible with this measurement are shown on the right hand side of FIG. 4. We have EC−EC'=FD−FD'. We note that both lines come close to the source point, s.

What we claim is:

1. A radiation imaging device for determining the distribution of a radioisotope into an object, the device comprising:
   (a) a wire mesh conversion means for absorbing radiation emitted by the radioisotope and thereby releasing electrons, said means forming a substantially solid structure with a plurality of parallel holes therethrough;
   (b) a ionizable media in said holes for propagating ionization events caused by the released electrons;
   (c) a detector means for determining the spatial position of ionization events; and
   (d) an electric field means for generating an electric drift field substantially parallel to the holes of the conversion means, whereby ionization events can be transported to the detector means and a distribution image of object obtained.

2. The device of claim 1 wherein the conversion means further comprises at least one wire mesh stack comprised of a metal wire with an atomic number greater than fifty.

3. The device of claim 2 wherein the metal wire comprises tungsten wire.

4. The device of claim 2 wherein the metal wire comprises gold wire.

5. The device of claim 2 wherein the diameter of the metal wire is on the order of 10-3 centimeters and the separation between wires is on the order of 10-1 centimeters.

6. The device of claim 2 wherein the density of the conversion means is about 1-30 grams per cubic centimeter.

7. The device of claim 2 wherein the density of the conversion means is about 20 grams per cubic centimeter.

8. The device of claim 1 wherein the conversion means comprises a plurality of wire mesh stacks on the order of 5 to 40 centimeters thick.

9. The device of claim 1 wherein the ionization media comprises ionizable gas.

10. The device of claim 9 wherein the ionization media comprises a non-flammable ionizable gas.

11. The device of claim 1 wherein the detector means comprises a proportional wire chamber.

12. The device of claim 1 wherein the electric field means comprises a graded voltage potential between the conversion means and ground.

13. The device of claim 1 wherein the device further comprises a signal processing means connected to the detector means for processing the ionization events detected.

14. A system for producing tomographs of the perfusion of a radioisotope into an object, the system comprising:
   (a) two devices as described in claim 1 situated on opposite sides of the object; and
   (b) signal processing means connected to the detector means of each device for processing the ionization events detected, correlating near-simultaneous events, determining the time-difference between said correlated events and locating the source of the radiation, thereby permitting a three dimensional view of the perfusion to be constructed.

15. A method of focusing on the source of co-linear positron annihilation radiation which comprises:
   (a) disposing two of the radiation imaging devices of claim 1, each on an opposing side of said radiation source;
   (b) determining the spatial position of conversion within the detector means of each device;
   (c) measuring the time difference between the radiation conversion events in each device from which the difference in depth of the two radiation conversion points in each device can be determined; and
   (d) computing a trajectory line and estimating a source point from said conversion points and said detection time difference.

* * * * *